United States Patent
Jeong et al.

(10) Patent No.: US 7,979,426 B2
(45) Date of Patent: Jul. 12, 2011

(54) CLUSTERING-BASED INTEREST COMPUTATION

(75) Inventors: Sangoh Jeong, Palo Alto, CA (US); Yu Song, Pleasanton, CA (US); Doreen Cheng, San Jose, CA (US); Swaroop S. Kalasapur, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 230 days.

(21) Appl. No.: 12/371,419

(22) Filed: Feb. 13, 2009

(65) Prior Publication Data

US 2009/0307176 A1    Dec. 10, 2009

Related U.S. Application Data

(63) Continuation-in-part of application No. 12/134,143, filed on Jun. 5, 2008, and a continuation-in-part of application No. 12/343,395, filed on Dec. 23, 2008.

(51) Int. Cl.
*G06F 7/00* (2006.01)
*G06N 5/02* (2006.01)

(52) U.S. Cl. .......................................... 707/723; 706/46

(58) Field of Classification Search .................. 707/736, 707/737, 758, 802, 803; 706/15, 12–14, 706/45–56; 709/238
See application file for complete search history.

(56) References Cited

U.S. PATENT DOCUMENTS

| | | | |
|---|---|---|---|
| 6,360,227 B1 * | 3/2002 | Aggarwal et al. | 1/1 |
| 6,848,104 B1 | 1/2005 | Van Ee et al. | |
| 7,174,343 B2 * | 2/2007 | Campos et al. | 707/737 |
| 7,251,637 B1 * | 7/2007 | Caid et al. | 706/15 |
| 2001/0014868 A1 | 8/2001 | Herz et al. | |
| 2003/0043815 A1 * | 3/2003 | Tinsley et al. | 370/395.21 |
| 2004/0220963 A1 * | 11/2004 | Chen et al. | 707/103 R |
| 2005/0182852 A1 * | 8/2005 | Tinsley et al. | 709/238 |
| 2005/0234973 A1 * | 10/2005 | Zeng et al. | 707/103 R |
| 2007/0174267 A1 * | 7/2007 | Patterson et al. | 707/5 |
| 2007/0271266 A1 * | 11/2007 | Acharya et al. | 707/6 |
| 2009/0063537 A1 * | 3/2009 | Bonnefoy-Cudraz et al. | 707/102 |

OTHER PUBLICATIONS

Chen et al., "A Survey of Context-Aware Mobile Computing Research," Dartmouth Computer Science Technical Report TR2000-381, Dartmouth College, 2000.

Cho et al., "Minimum Sum-Squared Residue Co-clustering of Gene Expression Data", Proceedings of the Fourth SIAM International Conference on Data Mining (SDM), pp. 114-125, Apr. 2004.

Deshpande et al. "Item-based top-n recommendation algorithms." In Proc. of IEEE MDM '06, 2006.

(Continued)

*Primary Examiner* — Hung T Vy
(74) *Attorney, Agent, or Firm* — Beyer Law Group LLP

(57) ABSTRACT

Data relating to usage patterns of the user are stored. The data includes a context portion having information as to the context in which items were used and an interest rating portion indicative of an interest of the user in one or more objects of interest. The data is clustered into clusters of data points. For each of the clusters, a centroid is determined. The centroid includes a context portion and an interest rating portion. A current context of the user is received. Clusters are selected by comparing a data point representing the current context with the context portion of one or more centroids. Based on the selected clusters, an interest rating is computed. The computed interest rating indicates an interest of the user in one of the one or more objects of interest, given the current context.

25 Claims, 11 Drawing Sheets

OTHER PUBLICATIONS

Gersho et al. "Vector Quantization and Signal Compression" chapters 2-4, Kluwer Academic Press, 1992.

Herlocker et al., "An Algorithmic Framework for Performing Collaborative Filtering." In Proc. of SIGIR, 1999.

J.A. Flanagan. "Unsupervised clustering of context data and learning user requirements for a mobile device." 5th International and Interdisciplinary Conference on Modeling and Using context (CONTEXT-05), pp. 155-168, 2005.

J.B. MacQueen. "Some Methods for classification and analysis of multivariate observations." Proceedings of 5th Berkeley Symposium on Methematical Statistics and Probability, Berkeley, University of California Press, 1:281-297, 1967.

Linde et al. "An algorithm for vector quantizer design." IEEE Transactions on Communications, vol. Com-28, No. 1, Jan. 1980.

Madeira et al. "Biclustering algorithms for biological data analysis: a survey." IEEE Transactions on Computational Biology and Bioinformatics, vol. 1, issue 1, pp. 24-45, 2004.

Oku et al. "Context-aware SVM for context-dependent information." Proceedings of the 7th International Conference on Mobile Data Management (MDM '06), 2006.

Rack et al. "Context-aware, ontology-based recommendation." Proceedings of the International Symposium on Applications and the Internet Workshops (SAINTW '06), 2005.

Ricci et al. "Acquiring and revising preferences in a critique-based mobile recommender system." IEEE Computer Society, 2007.

Woerndl et al. "A hybrid recommender system for context-aware recommendations of mobile applications." IEEE 2007.

Woerndl et al. "Utilizing physical and social context to improve recommender systems." IEEE International Conferences on Web Intelligence and Intelligent Agent Technology Workshops, 2007.

Zhang et al. "Spontaneous and context-aware media recommendation in heterogeneous spaces." IEEE 2007.

Mobasher et al. "Semantically Enhanced Collaborative Filtering on the Web." AAI Workshop on Semantic Web Personalization (SWP 2004).

Leung et al. "Applying Cross-Level Association Rule Mining to Cold-Start Recommendation/" Web Intelligence and Intelligent Agent Technology, 2007.

Szomszor et al. "Folksonomies, the Semantic Web, and Movie Recommendations," 4th European Semantic Web Conference, 2007.

Park et al. "Naïve Filterbots for Robust Cold-Start Recommendations," KDD 2006.

Good et al. "Combining Collaborative Filtering with Personal Agents for Better Recommendations," AAAI/IAAI, 1999.

Office Acion in U.S. Appl. No. 12/134,143 dated Nov. 29, 2010.

* cited by examiner

| Time | Loc. | Temp | Email | Web | Note | Pop music | Classical |

| | 504 | | 506 | | 508 |
|---|---|---|---|---|---|
| | PLACE | TIME | POP MUSIC | CLASSICAL | EMAIL |
| 502a | 01 (work) | 001 (evening) | 5 | 1 | 1 |
| 502b | 10 (home) | 010 (noon) | x | 4 | 0 |
| 502c | 10 (home) | 100 (morning) | 1 | x | 1 |
| | ... | ... | ... | ... | ... |

550

| | 552 | | 554 | | 556 |
|---|---|---|---|---|---|
| | PLACE | TIME | POP MUSIC | CLASSICAL | EMAIL |
| 550a | a1 b1 | c1 d1 e1 | 3 | 2.5 | .67 |
| 550b | a2 b2 | c2 d2 e2 | x | 3.2 | 0 |
| 550c | a3 b3 | c3 d3 e3 | 4.2 | x | .45 |
| | ... | ... | ... | ... | ... |

CLUSTERING-BASED INTEREST COMPUTATION

CROSS-REFERENCE TO RELATED APPLICATIONS

This application is a continuation-in-part of and claims priority to commonly owned and co-pending U.S. patent application Ser. No. 12/134,143, entitled "Situation-dependent Recommendation Based on Clustering," filed on Jun. 5, 2008, which is hereby incorporated by reference herein in its entirety for all purposes.

This application is a continuation-in-part of and claims priority to commonly owned and co-pending U.S. patent application Ser. No. 12/343,395, entitled "Context-based Interests in Computing Environments and Systems," filed on Dec. 23, 2008, which is hereby incorporated by reference herein in its entirety for all purposes.

BACKGROUND OF THE INVENTION

1. Field of the Invention

The present invention relates to software applications. More particularly, the present invention relates to the clustering of data to predict interests and interest ratings.

2. Description of the Related Art

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, a mobile phone or cell phone can be a long-range, portable electronic device used for mobile communication. In addition to the standard voice function of a telephone, current mobile phones can support many additional services such as Short Message Service (SMS) for text messaging, email, packet switching for access to the Internet, and Multimedia Messaging Service (MMS) for sending and receiving photos and video. Most current mobile phones connect to a cellular network of base stations (cell sites), which is in turn interconnected to the public switched telephone network (PSTN) (one exception is satellite phones).

SMS, often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2 and Open Mobile Alliance (OMA).

A popular task for many computing devices is to link people with relevant information. Different computing devices perform such linking in a variety of ways, depending on the needs of a particular application. Many people, for example, are accustomed to typing keywords into an Internet search engine to find desirable information. Visitors to an e-commerce site are often greeted with ads and recommendations tailored to their preferences. Particular computing devices derive such recommendations from a comparison between the visitor's past purchasing decisions and the purchasing decisions of other users.

The generation of recommendations in this manner can involve the processing of large amounts of user data. Various techniques have been used to optimize such processing. Some computing devices use fixed, predetermined rules that prioritize one type of user data over another in making a recommendation. Other computing devices, for example, pose direct questions to a user to determine what the user desires at a later time.

These approaches, while effective in many applications, have weaknesses. Direct questioning is often disliked by users and consumes time and system resources. Rules typically require updating and may be based on faulty assumptions.

Accordingly, techniques that can help computing devices make better recommendations for one or more users would be useful.

SUMMARY OF THE INVENTION

In one embodiment, a method for predicting an interest of a user in an object of interest is provided. Data relating to a usage pattern of the user are stored. The data includes a context portion having information as to the context in which items were used and an interest rating portion indicative of an interest of the user in one or more objects of interest. The stored data is clustered into clusters of data points. For each of the clusters, a centroid is determined. The centroid includes a context portion and an interest rating portion. A current context of the user is received. The clusters are selected by comparing a data point representing the current context with the context portion of one or more centroids. Based on the selected clusters, an interest rating is computed. The interest rating indicates an interest of the user in one or more objects of interest, given the current context.

In another embodiment, another method for predicting an interest of a user in an object of interest is provided. Data is stored, where the data relates to usage patterns of the user and includes an application portion having information as to items which were used, a context portion having information as to the context in which the items were used, and an interest rating portion indicative of an interest of the user in one or more objects of interest. The stored data is clustered into clusters of data points. For each of the clusters, a centroid is determined. The centroid includes an application portion, a context portion and an interest rating portion. A first centroid of the centroids has a first interest rating portion that has a first unknown interest rating. The first unknown interest rating indicates an unknown level of interest of the user in a first object of interest of the one or more objects of interest. Each of Z other centroids have interest rating portions with a known interest rating indicating a known interest of the user in the first object of interest. Z is any integer over 0. A relevance of the first one of the centroids to each of the Z centroids is determined. Based on the relevancies and the known interest ratings of the Z centroids, a first supplementary interest rating is generated. Current application information and a current context are received. Clusters are selected by comparing the current application information and the current context with the application portions and the context portions of one or more centroids. Based on the selected clusters, an interest rating is computed. The interest rating indicates an interest of the user in one of the one or more objects of interest, given the current application information and the current context.

In another embodiment, an apparatus is provided. The apparatus includes an interface and one or more processors. The one or more processors are configured to perform various operations. These operations include: 1) storing data relating to usage patterns of the user, wherein the data includes an application portion having information as to items which were used, a context portion having information as to the context in which the items were used, and an interest rating portion indicating an interest of the user in one or more objects of interest; 2) clustering the data into clusters of data points; 3) determining, for each of the clusters, a centroid, wherein the centroid includes an application portion, a context portion and an interest rating portion; 4) receiving current application information and a current context; 5) selecting clusters by comparing a data point representing the current application information and the current context with the application portions and the context portions of one or more centroids; and 6) computing, based on the selected clusters, an interest rating indicative of an interest of the user in one of the one or more objects of interest, given the current application information and the current context.

In another embodiment, a system for predicting an interest rating indicating an interest of a user in an object of interest is provided. The system comprises: 1) means for storing data relating to usage patterns of the user, wherein the data includes a context portion having information as to the context in which items were used, and an interest rating portion indicative of an interest of the user in one or more objects of interest; 2) means for clustering the data into clusters of data points; 3) means for determining, for each of the clusters, a centroid, wherein the centroid includes a context portion and an interest rating portion; 4) means for receiving a current context of the user; and 5) means for selecting clusters by comparing a data point representing the current context with the context portion of one or more centroids.

In another embodiment, a computer readable medium embodied in a tangible form is provided. The computer readable medium includes executable computer program code operable to predict an interest in an object of interest in a situation. The computer readable medium includes: 1) executable computer code operable to store data relating to usage patterns of the user, wherein the data includes an application portion having information as to items which were used, a context portion having information as to the context in which the items were used, and an interest rating portion indicative of an interest of the user in one or more objects of interest; 2) executable computer code operable to cluster the data into clusters of data points; 3) executable computer code operable to determine, for each of the clusters, a centroid, wherein the centroid includes an application portion, a context portion and an interest rating portion and wherein a first centroid of the centroids has a first interest rating portion that has a first unknown interest rating indicative of an unknown level of interest by the user in a first object of interest of the one or more objects of interest and wherein each of Z other centroids have interest rating portions with a known interest rating indicating a known interest of the user in the first object of interest, Z being any integer over 0; 4) executable computer code operable to determine a relevance of the first one of the centroids to each of the Z centroids; 5) executable computer code operable to generate, based on the relevancies and the known interest ratings of the Z centroids, a first supplementary interest rating in the first object of interest; 6) executable computer code operable to receive current application information and a current context; 7) executable computer code operable to select clusters by comparing the current application information and the current context with the application portions and the context portions of one or more centroids; and 8) executable computer code operable to compute, based on the selected clusters, a interest rating indicative of an interest of the user in one of the one or more objects of interest, given the current application information and the current context.

BRIEF DESCRIPTION OF THE DRAWINGS

FIG. 1 is a diagram illustrating an example vector storing context, usage and interest information for a single data point.

DETAILED DESCRIPTION OF SPECIFIC EMBODIMENTS

Figure 2:
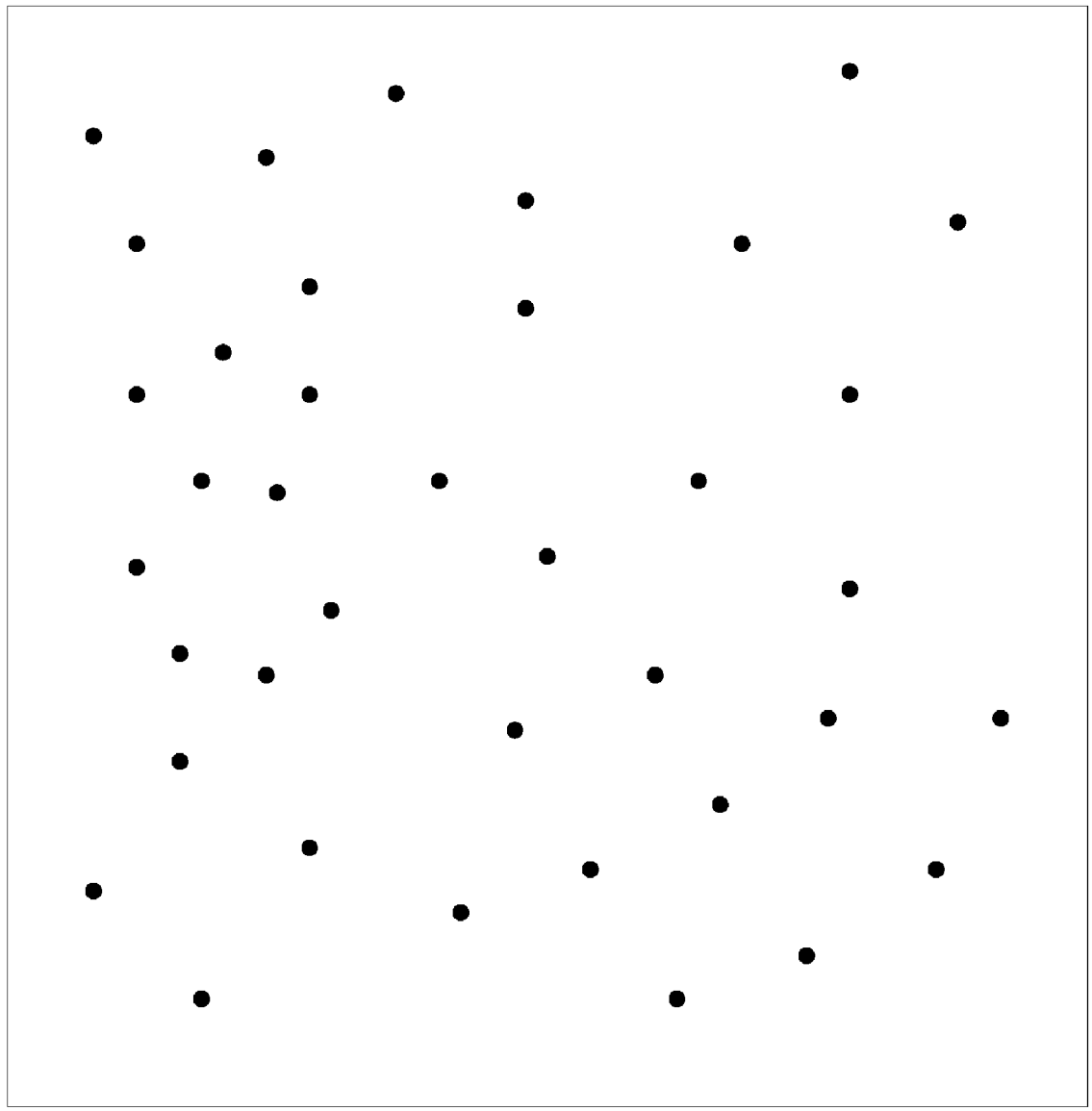
FIG. 2 is a diagram illustrating an example graph.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, the interest of a user in an object of interest is predicted based on data related to the current context and/or current application usage. Context refers to the situation in which the user and/or device the user is operating. For example, the context may include the location of the user—whether the user is home, at the office, or elsewhere. The context may also include the time of day—for example, whether it is morning, afternoon, or evening. One of ordinary skill in the art will recognize that there may be many other types of information captured by the context and nothing in this document shall be read as limiting the invention to any particular type of information.

One way for a system to learn about the interests of a user would be through direct inquiry. This solution, however, suffers from the drawback that user studies have shown that few users would bother to specify interests in response to direct questions. Furthermore, even when interests are specified, user interests can often be situation-dependent, i.e., a user's interests vary from situation to situation. For example, while a user may have an interest in listening to pop music while working out or during a morning drive to work, the same user may prefer to listen to classical music while relaxing at home in the evening.

Other approaches require the user to effectively train the device over a period of time ("supervised training"). However, supervised training may not be an ideal or a desired solution for many applications as it requires the use to spend a significant amount of time and effort to actively train the device. Another drawback is that conventional approaches are not flexible and do not readily adapt to changes in interests, environment, or habits associated with the use of the device. Therefore, improved techniques for enhancing mobile devices and/or their use are needed.

As such, in an embodiment of the present invention, context, application usage and/or interest information is captured and utilized in an interest prediction process. Data relating to context, application usage information and/or interests in various objects may be collected and stored as data points. The data point information may be stored in vectors. FIG. 1 is a diagram illustrating an example vector storing context, usage and interest information for a single data point. In this example, context information includes time 100, location 102, and temperature 104. Application usage information indicates which applications the user operated, including email 106, web browsing 108, and notepad 110. Interest information indicates the interest of a user in one or more objects of interest, including pop music 112 and classical music 114.

Each data point may also be understood as a point on a graph with two or more dimensions. FIG. 2 is a diagram illustrating an example graph. The proximity of data points to one another on the graph indicates the level of similarity of their vectors. In an embodiment of the present invention, these data points may be grouped into clusters of similar data points. Clustering is the classification of objects into different groups, or more precisely, the partitioning of a data set into subsets (clusters), so that the data in each subset (ideally) share some common trait—often proximity according to some defined distance measure. These clusters may then be utilized in aiding the system select appropriate applications to recommend.

Figure 3:
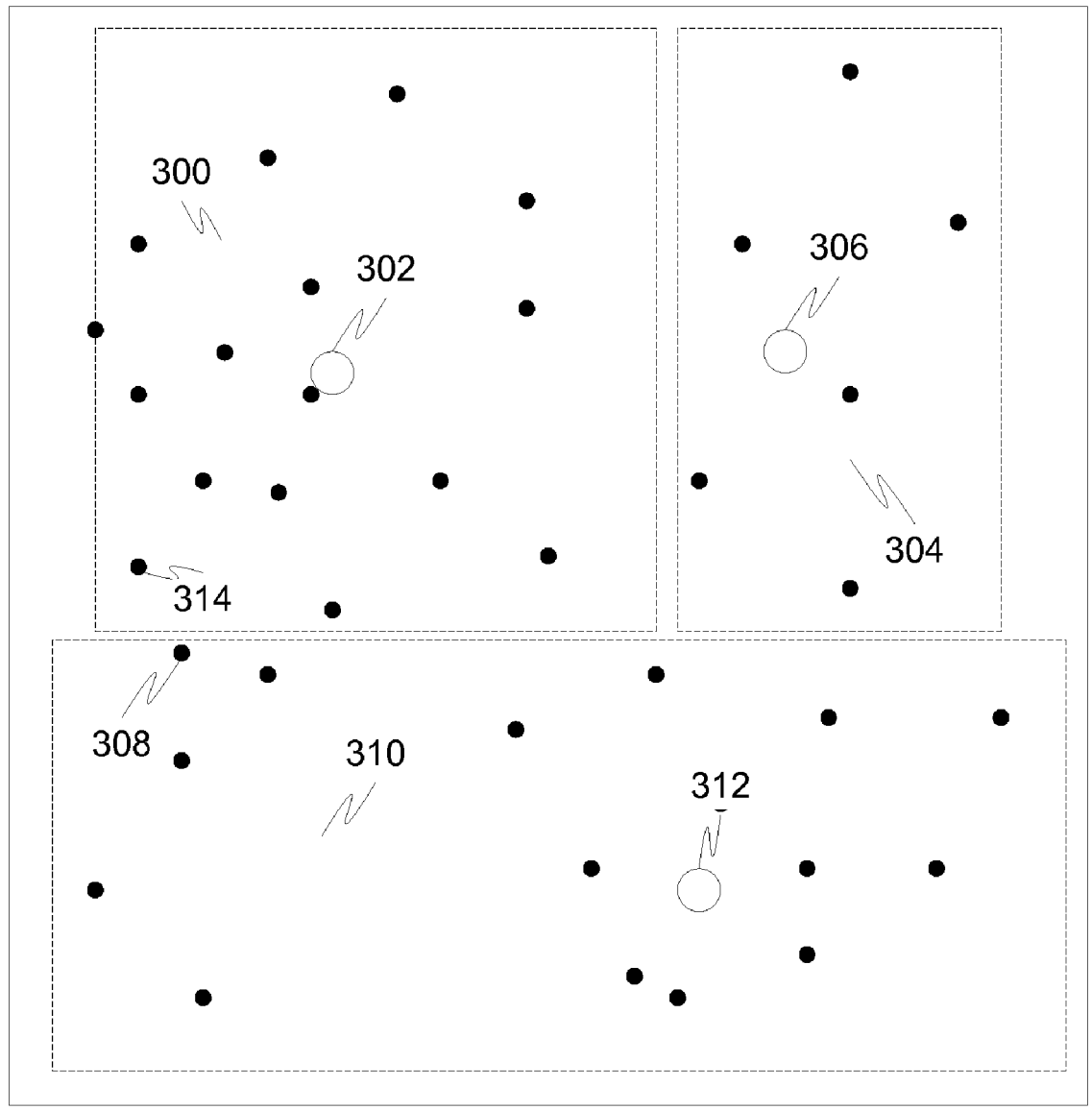
FIG. 3 is an example of the graph with the data points clustered.

One way to cluster the data points is to attempt to determine the optimum number of clusters for a given set of data points. This optimum number is known as K. There are a number of traditional techniques for making this determination, all of which are beyond the scope of this application. There are numerous drawbacks to this approach, however. K must be determined dynamically, and as such requires significant processing power, processing power that may be lacking in mobile devices. Additionally, k can be very difficult to determine with any degree of accuracy, and an incorrect guess can negatively impact both the clustering and recommendation accuracy. Given the partitioned clusters, one way to extract patterns is to compare the current data point with each of the cluster centroids and determine to which cluster the current data point belongs. The application patterns are then extracted from this cluster. For n-dimensional structures, a centroid can be an intersection of all hyperplanes that divide X into two parts of equal moment about the hyperplane. Informally, it is the "average" or "mean" of all points of X. Thus, a centroid of a cluster can be the mean of all points in the cluster. (It should be noted that the term "centroid" can also refer to any data that is related to a particular cluster.) FIG. 3 is an example of the graph with the data points clustered. Cluster 300 has centroid 302 and Cluster 304 has centroid 306.

Comparing the centroids, however, may create a situation where certain neighboring data points may not be selected as one of the k neighboring data points, despite being close to the current data point, simply because they are part of clusters whose centroid is farther from the current data point than other centroids. One instance of such a case is depicted in FIG. 3, where data point 308 is part of cluster 310. Data point 308 is closer to cluster 300 than any of the data points in cluster 304, yet because the centroid 312 of cluster 310 is farther from the centroid 302 of cluster 300 than the centroid 306 of cluster 304, data point 308, despite being arguably the most similar to a relevant data point 314 in cluster 300, may not be used in the analysis.

In contrast to clustering, another way to extract patterns is to group neighboring data points nearest to the current data point. The nearest neighbors are those that are most similar to the current contexts and application usages. The application patterns are then extracted from these neighboring instances. This approach, however, requires that all of the existing data points be compared in order to find the neighbors, and thus is also not suitable for online computation on resource-limited devices such as mobile In an embodiment of the present invention, rather than estimating an "optimal" number of clusters before starting the clustering process, the number of clusters is dynamically chosen. Additionally, the number is chosen so as to result in compact (i.e., small) clusters. A threshold may be selected for the maximum number of points in a cluster and the clusters may be divided so that no cluster exceeds this threshold. In an alternative embodiment, rather than an upper threshold, a number representing the average number of points in a cluster may be selected and the data points clustered so that each cluster has at or near that number of data points. For example, if 5 is the average number of data points in each resulting cluster, and there are 3000 total data points in the usage data, then the data may be clustered into 600 clusters. Then, for each cluster, a centroid is computed and stored along with its containing data point. The compactness of a cluster may be measured by the average Euclidean distance from the data points in a cluster to the cluster's centroid. The smaller the average, the more compact a cluster is. The advantage of this approach is that, because the clusters are compact, the centroids better represents the data points in the corresponding clusters. This approach also does not require the resource-intensive task of deriving an optimal number for K.

It can sometimes be useful to form relatively large clusters. An advantage of larger clusters is that their centroids, which are fewer in number, can be more quickly compared to a particular data point. For example, if an input data point representing current usage information and/or a current context of a user needs to be compared to the centroids in order to compute the interests of the user, such a computation can be processed more quickly if the centroids are larger and fewer in number rather than smaller and more numerous. The size and number of clusters can be tailored to the needs of a particular application.

In an embodiment of the present invention, both the context portion and application usage portion of a vector are used as input to a clustering algorithm. The result of this is a set of clusters wherein the centroid of each cluster contains a context portion and an application usage portion. The context portion of the centroid may be utilized for situation recognition. Specifically, the context portion may be used to compare with the user's current context to identify clusters similar to the user's current context. The application usage portion may be used to compare with the items the user is currently utilizing (e.g., currently running applications) to identify clusters similar to the user's current usage. In some embodiments, either the context or the application usage portion of the vector (but not both) are used as an input to the clustering algorithm. In another embodiment, the context, application usage and interest portions of vectors are used as inputs to the clustering algorithm.

In other words, the context portion may be utilized to identify clusters based on the user's current context while the application usage portion may be utilized to identify clusters based on the user's current usage of items. In one embodiment, both are used together.

When a new point comes in (e.g., a prediction of an interest rating is to be made based on a current context and/or application usage), then this data point may be compared to the k closest neighboring centroids, rather than all of the data points. This greatly reduces the processing required to make the prediction as it is no longer necessary to compare each individual data point to the new data point in order to generate predictions.

Figure 4:
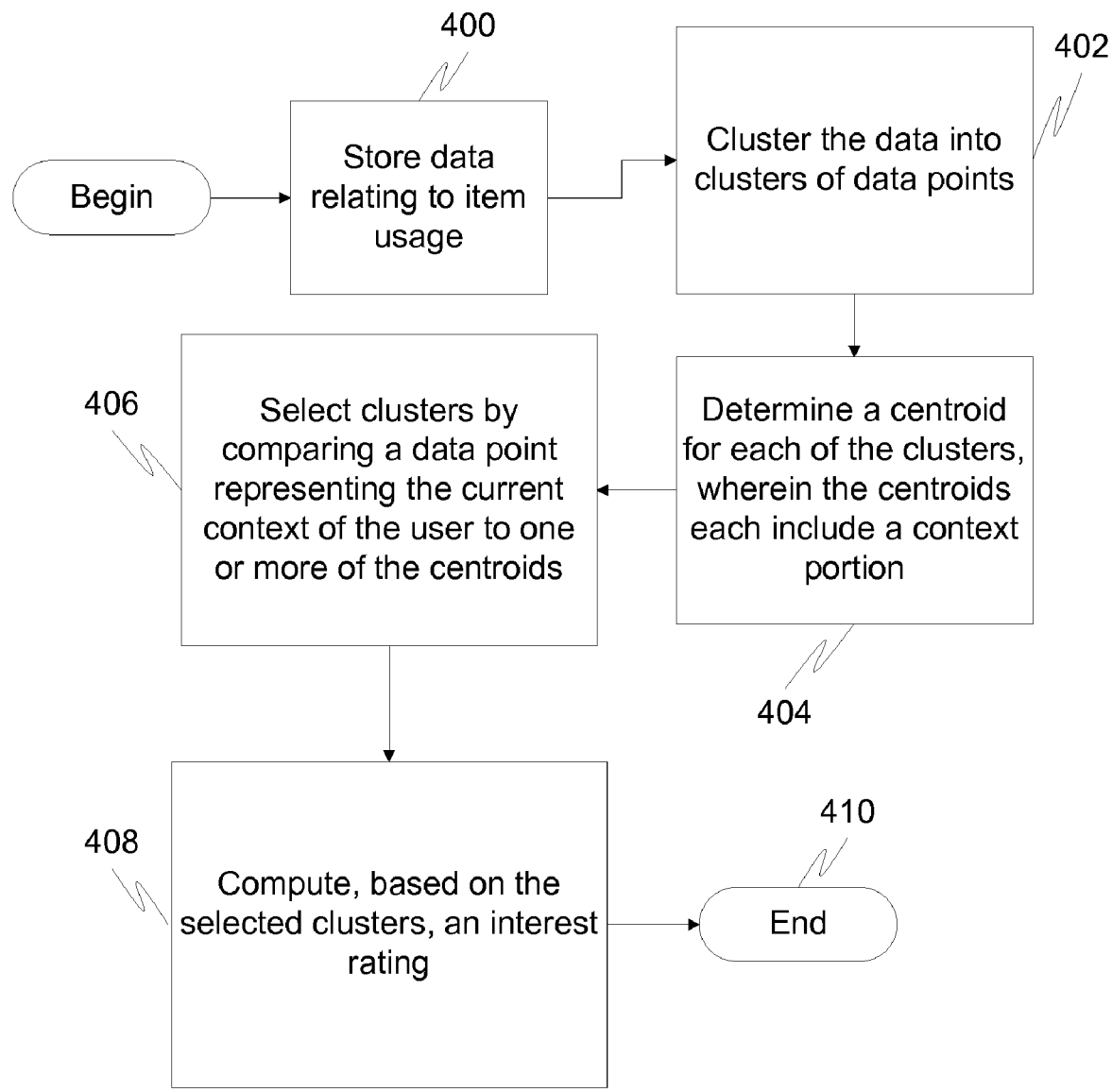
FIG. 4 is a flow diagram illustrating a method for predicting an interest rating indicative of an interest of a user in one or more objects of interest according to an embodiment of the present invention.

FIG. 4 is a flow diagram illustrating a method for predicting an interest of a user in an object of interest. Each step in this method may be embodied in hardware, software, or any combination thereof. The user may be utilizing an electronic device. This device may be a stationary device, such as a desktop computer, or may be a mobile device, such as a mobile phone, PDA, or laptop computer. One of ordinary skill in the art will recognize that other types of devices may be used with the present invention, and that nothing in this document shall be interpreted as limiting the device to any particular implementation.

At step 400, data relating to application usage patterns of the user is stored. This data includes context information, application usage information and/or interest rating information. The application usage information may include information as to items which were used by the user. The context information can indicate the context in which they were used. In one embodiment of the present invention, the items may include software applications running on the device. In another embodiment of the present invention, the items may include computing services. This may include, for example, applications that run on other devices, such as remote games, diagnostic services, or antivirus services. In another embodiment of the present invention, the items may include other information, such as, for example, movies, web sites, music, etc. One of ordinary skill in the art will recognize that many different types of objects may be recommended using various embodiments of the present invention. The interest rating information can indicate interests of a user in one or more objects of interest. The strength of these interests can be reflected in the form of interest ratings. For example, a strong interest in video games could be represented by an interest rating of 5 on a scale of 0 to 5. This data may be stored in, for example, vectors. The vectors may contain contexts concatenated with application usage values and/or interest rating values.

Figures 5A, 5B:
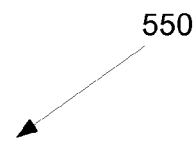
FIG. 5A is a diagram illustrating data components according to an embodiment of the present invention.
FIG. 5B is a diagram illustrating centroids according to an embodiment of the present invention.

FIG. 5A illustrates an example of stored data in the form of data components 502, which are structured as rows in the illustrated embodiment. Each data component 502, which can be represented as a single data point and/or a vector, includes a data context portion 504, a data interest rating portion 506, and a data application portion 508. The portions 504, 506 and 508 of each data component 502 characterize the context, application usage pattern, and/or interests of a user at one or more points in time. Data component 502a, for example, indicates that the user, while at work in the evening, at least once showed a high degree of interest in pop music (as indicated by the interest rating of 5) and used a music program (as indicated by the value of 1 as opposed to 0).

Data interest rating portion 506 includes one or more interest ratings. Each such interest rating indicates the intensity or strength of a user's interest in one or more objects of interest (e.g., pop and classical music.) These interest ratings can be limited to a range of discrete or continuous values, although any kind of value can be used. In some embodiments, all of the interest ratings use a similar range or metric (e.g., the range of integers from 0 to X, X being any positive integer.) The interest ratings of data interest rating portion 506 can contain information reflecting not only the strength of a user's interest, but possibly other characteristics of that interest, such as how it was expressed, the nature of the data supporting the interest rating, etc. Data application portion 508 indicates what applications a user employed at one or more points in time. Portion 508 could be limited to applications that the user has to activate through a deliberate physical action, such as through the clicking of an appropriate desktop shortcut icon for a spreadsheet or a game. The applications stored in application portion 508 could also pertain to "invisible" programs of which a user is unaware, such as routines that run in the background of an operating system.

Data components 502 can be broken down into discrete variables and values. In the illustrated embodiment, for example, each component 502 has a data context portion 504 with two context variables ("place" and "time"), a data interest portion 506 with two interests ("pop music" and "classical") and a data application portion 508 relating to an application usage pattern ("email.") The context variables, interests and application usage patterns in turn have context values, interest ratings and application values, respectively. The context variable "place," for example, has possible context values "work" and "home." The context variable "time" has possible context values "evening," "noon" and "morning." The interest rating for the interest "pop music" ranges from 0 to 5, where 5 indicates a very strong interest and 0 indicates a lack of interest in pop music. The application usage pattern "email" has values of 0 or 1, indicating a use or non-use of the application at one or more points in time. Of course, these variables, values and ranges can be represented using equivalent terms or altered for particular applications.

The aforementioned context information, variables and values can pertain to a wide variety of internal and/or external factors. Examples include geographical factors, physical/biological factors, environmental variables (e.g., location, temperature, presence of nearby devices, GPS signals, components, proximity of human beings, buildings and/or signals, motion, acceleration, velocity etc.) and/or internal variables (e.g., time, event, power, force, Internet browsing behavior, pattern of selected ads, direct or indirect feedback from the person etc.) In one embodiment, context information and application usage information are distinguishable in that application information pertains to programs (e.g., software applications) that are directly executed by a deliberate, physical act of a user, whereas context information describes aspects of the user's external environment (e.g., time, location, temperature, motion etc.) that are not directly executed or brought into being by the user.

The context values for data components 502 have been encoded as multi-dimensional, binary vectors (i.e. vectors that encode data in the form of multiple 0's and 1's or other equivalent values). Context variable "place," for example, has two possible context values, "home" and "work," which are encoded as "1 0" and "0 1" respectively. Context variable "time" has three possible context values, "morning," "midday" and "night," which are encoded as "1 0 0", "0 1 0" and "0 0 1" respectively. This is referred to as 1-in-N encoding. In other words, for a specific context variable, N is an integer equal to the number of possible context values. Each context value for that variable is encoded as a vector with N binary values. In the illustrated embodiment, the context value vectors for a specific context variable are similar in that they have the same number of values, but each is unique in terms of where their respective 1 values are positioned. For instance, with regard to context variable 306 ("place"), context value "work" has a 1 in the second position, and context value "home" has a 1 in the first position. Such encoding can be used to form vectors or portions of vectors from the stored data.

At step 402 of FIG. 4, the data is clustered into clusters of input data points. In the illustrated embodiment of FIG. 5A, such clustering can involve dividing data components 502 into distinct groups. The actual clustering may be accomplished using a variety of clustering techniques. In one embodiment, k-means clustering may be utilized. In k-means clustering, a system assigns each point to the cluster whose centroid is nearest. Thus, this procedure becomes:

(1) Randomly generate k clusters and determine the cluster centers, or directly generate k random points as cluster centers.

(2) Assign each point to the nearest cluster center.

(3) Recompute the new cluster centers.

(4) Repeat the two previous steps until some convergence criterion is met (usually that the assignment hasn't changed).

The main advantages of using k-means clustering are its simplicity and speed which allows it to run on large datasets. Its disadvantage is that it does not yield the same result with each run, since the resulting clusters depend on the initial assignments Another possible clustering technique is the use of co-clustering. Given a multi-dimensional data matrix, co-clustering refers to simultaneous clustering along multiple dimensions. Thus, for example, not only the objects are clustered but also the features of the objects, i.e., if the data is represented in a data matrix, the rows and columns are clustered simultaneously. In a two-dimensional case it is simultaneous clustering of rows and columns, in contrast to clustering along a single dimension. Co-clustering has the advantage of handling sparse data points better.

Yet another possible clustering technique is vector quantization. Vector quantization is a technique borrowed from signal processing that allows the modeling of probability density functions by the distribution of prototype vectors. It works by dividing a large set of points (vectors) into groups having approximately the same number of points closest to them. Each group is represented by its centroid point, as in k-means and some other clustering algorithms. Another possible clustering technique is hierarchical clustering. This type of clustering can involve separating stored data into individual data points, forming clusters from the data points and then repeatedly merging the formed clusters.

One of ordinary skill in the art will recognize that there are other clustering techniques that can be used in the present invention. Nothing in this document shall be construed as requiring the use of any particular clustering technique. In one embodiment of the present invention, both the context part and the application part of a vector are used as input to a clustering algorithm. In some embodiments, the clustering algorithm can receive as input one or more of the context portion, the application portion and the interest portion. This may be called "combined clustering." As will be seen later, this enables improved situation recognition performance by exploiting application usage patterns, contexts and/or possibly interests as well. A situation can be defined as a cluster of similar patterns of at least contexts, applications and/or interests.

At step 404, a centroid is determined for each of the clusters. When dealing with embodiments where both the context portion and the application portion of the vector were fed as input to the clustering algorithm, the result of this step will be centroids that each contain both an application portion and a context portion. In an alternative embodiment, the centroid will contain either a context portion or an application portion, but not both. In still another embodiment, the centroid will contain a content portion, an application portion and an interest rating portion.

FIG. 5B illustrates centroids 550 that are generated by step 404 according to one embodiment of the present invention. Each centroid 550 can include any data that corresponds to and/or relates to a cluster. Various portions of centroid 550 may or may not be generated using a clustering algorithm. In the illustrated embodiment, centroids 550 relate to data components 502 of FIG. 5A. Centroid 550a, for example, is based on a cluster consisting of data components 502a, 502b and 502c of FIG. 5A. Each centroid 550 has a centroid context portion 552, a centroid interest rating portion 554 and a centroid application portion 556. These portions correspond to the data context portion 504, data interest rating portion 506 and data application portion 508, respectively, of data components 502 of FIG. 5A.

The context portions of each centroid 550 are based on the context values of the data components in its corresponding cluster. Accordingly, the values a1 and b1 of centroid 550a are generated by an algorithm that receives as inputs the context values for the context variable "place" in data components 502a-c (i.e., the binary two digit sequences 01, 10 and 10). Similarly, c1, d1 and e1 are based on the three digit binary sequences 001, 010, 100 (i.e., the context values under the context variable "time" in data components 502a-c.) A wide range of known algorithms may be used to generate the values in the context portion 552 of centroid 550a.

The centroid interest rating portion 554 and centroid application portion 556 of centroid 550a are also based on the data interest portion 506 and the data application portion 502, respectively, of clustered data components 502a-c. The relationship between the centroid portions and the data portions may vary, depending on the needs of a particular application. The values for the centroid interest portion 554 and/or the centroid application portion 556, for example, may be based on an average of the corresponding data component values. In the illustrated embodiment, the centroid "pop music" interest rating is (5+1)/2=3 (i.e., the average of the pop music interest ratings for data components 502a and 502c.) Note that the pop music interest rating for the remaining data component in the cluster, component 502b, was ignored in the averaging formula, because component 502b had an uncertain or unknown interest rating value for pop music.

Returning to FIG. 4, at step 406, clusters similar to a current context of the user are selected by comparing a data point representing the current context of the user to one or more of the centroids. If the data point also represents the current application usage of the user, the current application usage can also be compared to the application portion of one or more centroids. In one embodiment of the present invention, the data point is compared to the centroids of each of the clusters. This comparison may include a series of steps.

Figure 6A:
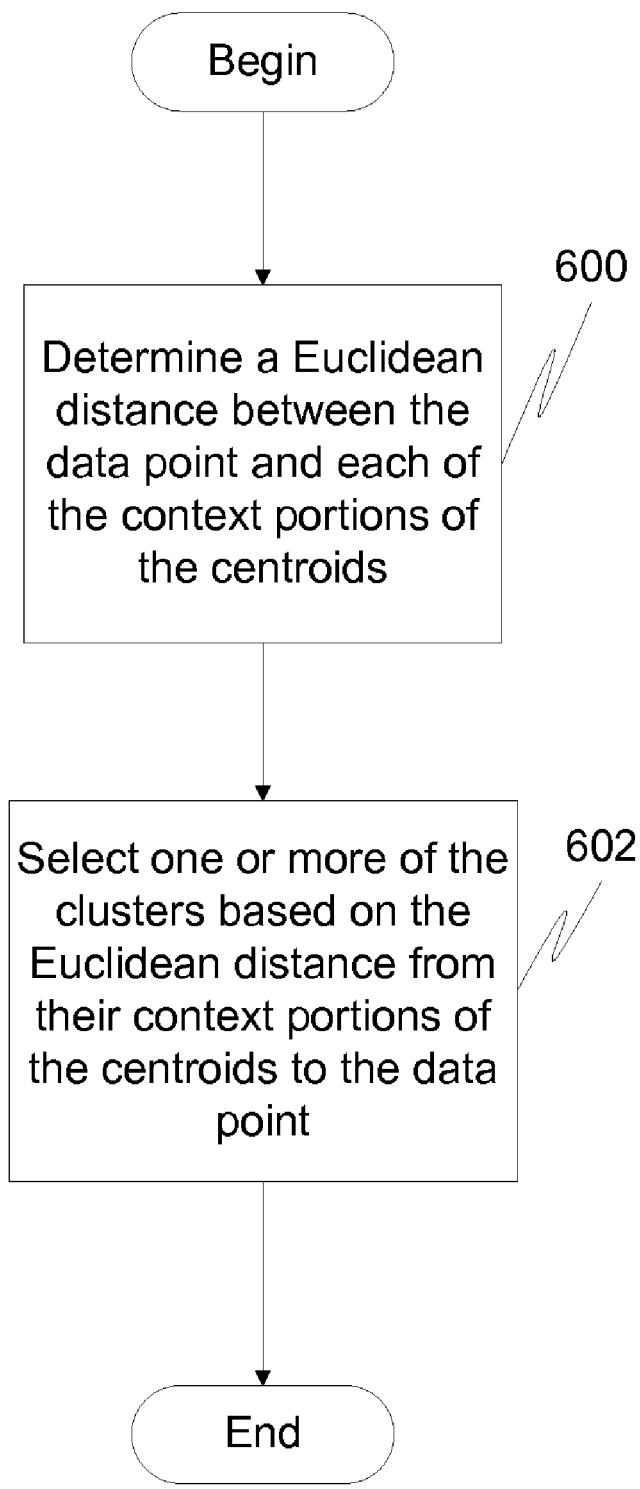
FIG. 6A is a flow diagram illustrating a method for selecting clusters similar to a current context of a user by comparing a data point representing the current context to one or more of the context portions of centroids according to an embodiment of the present invention

In cases where the centroids and data components each have an application portion and a context portion, these steps may involve either comparing just the context portions of the centroids and data components, or comparing both the context and application portions. FIG. 6A is a flow diagram illustrating a method for selecting clusters similar to a current context of a user by comparing a data point representing the current context of the user to one or more of the context portions of centroids in accordance with an embodiment of the present invention. Each step of this method may be embodied in software, hardware, or any combination thereof. At step 600, a Euclidean distance between the data point and each of the context portions of centroids may be determined. Various techniques exist for quickly and efficiently computing the Euclidean distance between data points. Such techniques are outside the scope of this disclosure, but one of ordinary skill in the art will recognize that any such technique may be utilized.

At step 602, one or more of the clusters may be selected based on the Euclidean distance from their centroids to the data point. The closest centroids to the data point represent the most similar clusters to the data point.

Figure 6B:
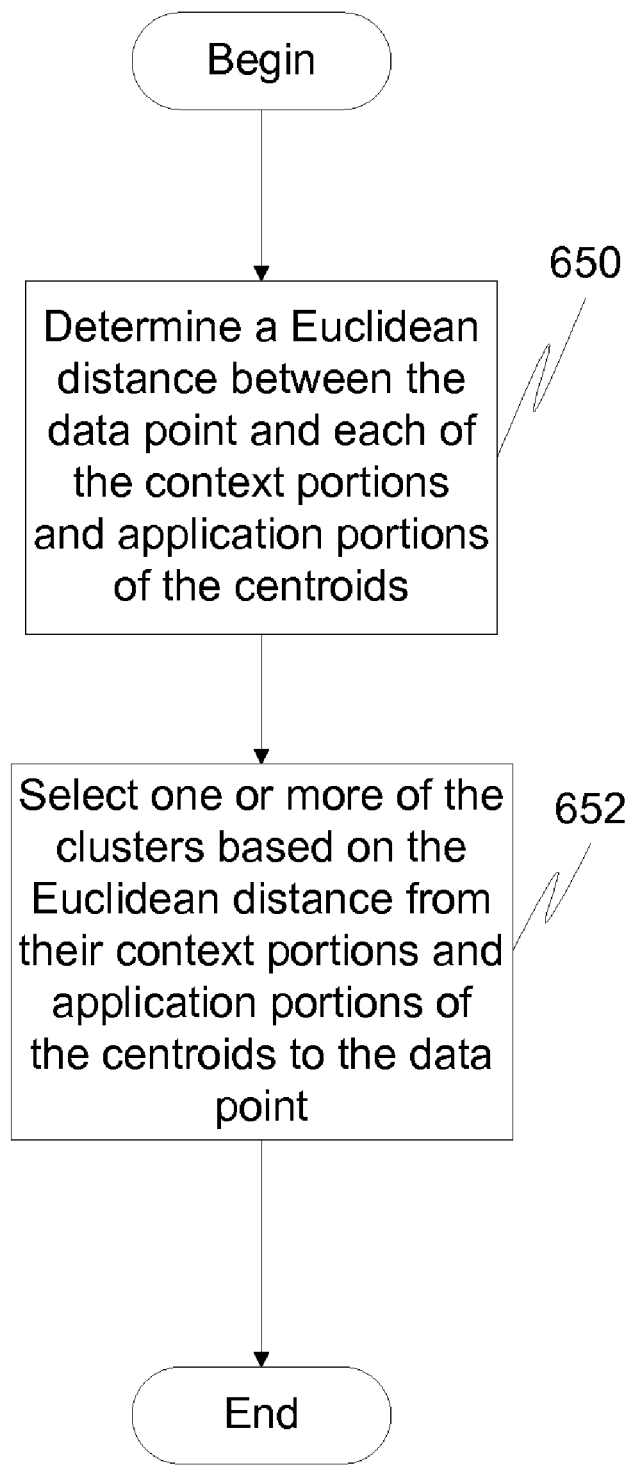
FIG. 6B is a flow diagram illustrating a method for selecting clusters similar to a current context of a user by comparing a data point representing the current context and the current application of the user to one or more of the context portions and application portions of centroids according to an embodiment of the present invention.

FIG. 6B is a flow diagram illustrating a method for selecting clusters similar to a current context of a user by comparing a data point representing the current context and the current application of the user to one or more of the context portions and application portions of centroids in accordance with an embodiment of the present invention. Each step of this method may be embodied in software, hardware, or any combination thereof. At step 650, a Euclidean distance between the data point and each of the context portions and application portions of centroids may be determined. Various techniques exist for quickly and efficiently computing the Euclidean distance between data points. Such techniques are outside the scope of this disclosure, but one of ordinary skill in the art will recognize that any such technique may be utilized.

At step 652, one or more of the clusters may be selected based on the Euclidean distance from their context and application portions of the centroids to the data point. The closest centroids to the data point (based on the context and application portions) represent the most similar clusters to the data point. How many of these closest clusters are selected may be determined by utilizing a pre-set maximum for the number of data points to be collected. For example, a system administrator may indicate a maximum of 30 data points for similar clusters. If each cluster has 10 data points, then the system may select the three clusters having the closest centroids to the data point representing the current context of the user.

It should be noted that the Euclidean distance is merely one way of comparing portions of clusters to data points. The invention shall not be deemed to be limited to use of Euclidean distance measurements for this purpose. Other embodiments are possible using, for example, L-p norm or quadratic distance.

Referring back to FIG. 4, once the one or more similar clusters have been selected, at step 408 the system computes an interest rating. This interest rating reflects the interest of a user in a particular object of interest, given the current context and/or current application usage of the user. One of ordinary skill in the art will recognize that this may be accomplished in many different ways. One way is to locate the centroid with the context and/or application values that are closest to the current context and/or application values. The prediction of an interest rating for the user can be based on one or more of the interest ratings of the closest centroid. In the simplest version of this approach, the predicted interest rating is equal to the interest rating of the closest centroid. This technique, which can be modified to suit particular applications, reduces system overhead and allow for a more rapid prediction.

For the purpose of illustrating one simple example of the above, assume that a prediction of an interest rating for a user is desired. In this example, the desired interest rating reflects an interest of the user in pop music. Additionally, this hypothetical user is currently at work in the evening and is using an email program. In this simple case and with reference to the conventions used in FIG. 5A, the user's current context and application usage is represented as the vector 0 1 (work) 0 0 1 (evening) 1 (music program). The vector [0 1 0 0 1 1] is compared to the corresponding portions of centroids 550 in FIG. 5B. Assume further that the closest centroid is determined to be centroid 550a, whose corresponding portions could be represented as the vector [a1 b1 c1 d1 e1 0.67]. As a result, in this simple example, the interest rating predicted for the user will be 3, which is the same as the interest rating presented in FIG. 5B in connection with pop music and centroid 550a.

Figure 7:
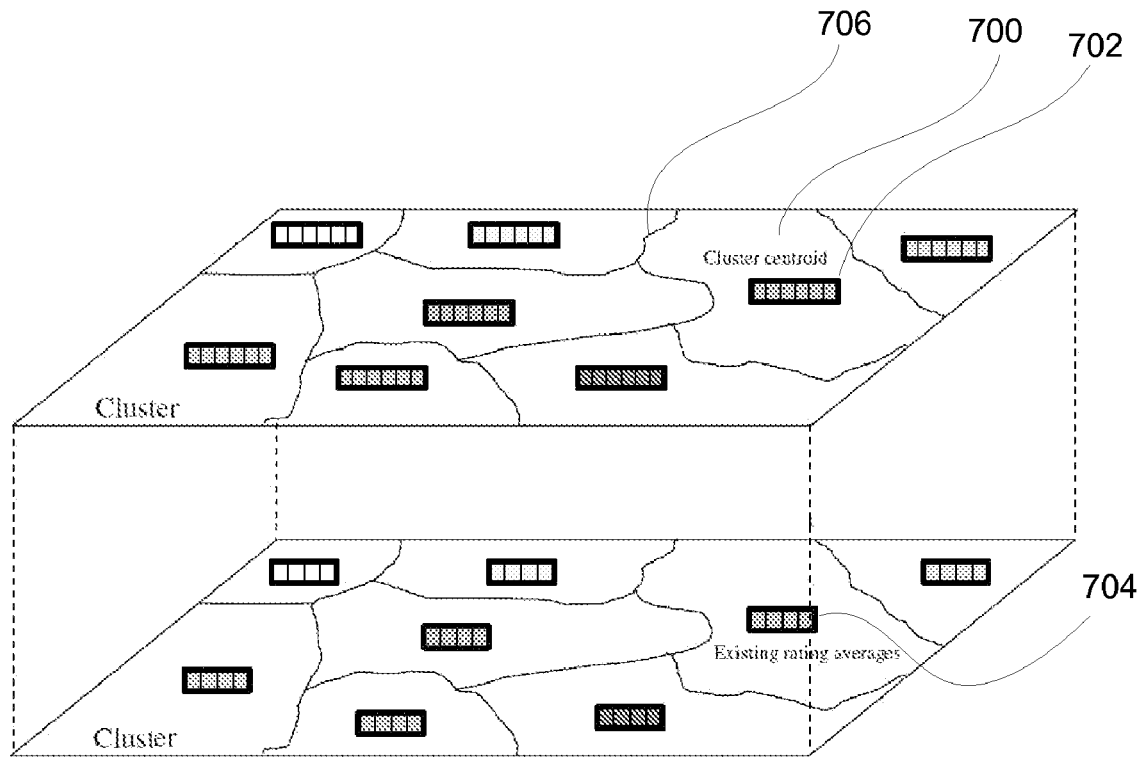
FIG. 7 illustrates exemplary clusters and their respective centroids according to an embodiment of the present invention.

FIG. 7 is a diagram illustrating the relationship between cluster boundaries, centroids and selection according to one embodiment of the present invention. The diagram contains clusters 700, which are defined by cluster boundaries 706. Each cluster 700 has a centroid with a context portion 702 and an interest portion 704. Each cluster 700 may also have an application portion (not shown). In one embodiment, when a data point representing current context and/or current application information is received, the information in the data point is compared to the corresponding portions 702 and 704 in the centroids. A computation of an interest rating for a user, given the current context and/or current application information, can be based on the interest portion 704 of the closest centroid.

It should be noted that some embodiments involve the repeated redrawing of clusters 700 and cluster boundaries 706. Data points that were once in one cluster 700 may be later found in another cluster. Since the clusters 700 can change, the corresponding centroids and their associated context, interest and/or application portions can change as well. Such redrawing can take place even when the total number of data points has not changed and no new data points have been introduced. An apparatus can be configured to perform such redrawing only while offline, as is discussed in further detail below.

Figure 8:
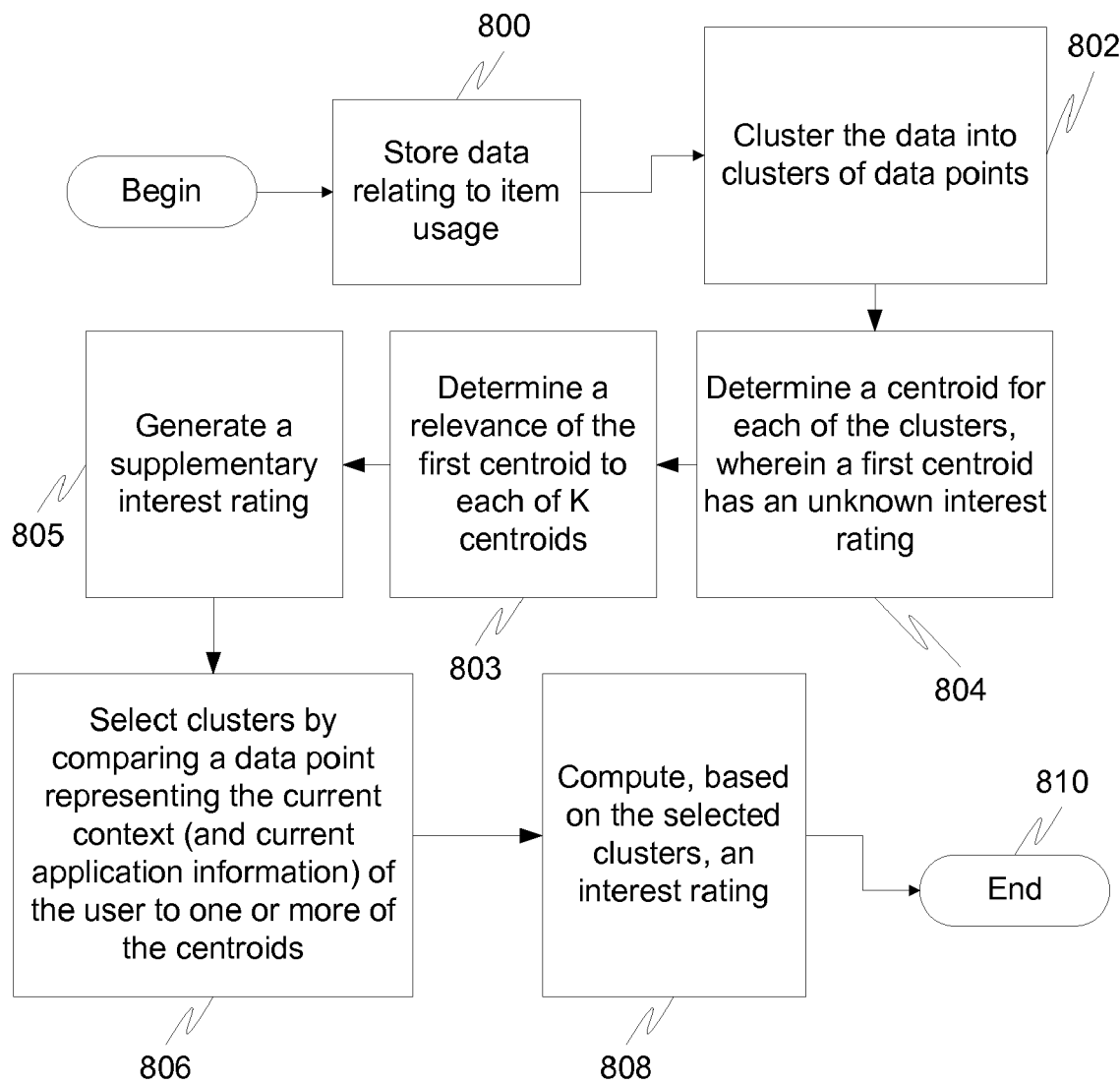
FIG. 8 is a flow diagram illustrating a method for predicting an interest rating indicative of an interest of a user in one or more objects of interest according to another embodiment of the present invention.

It should also be noted that, in order to increase computing efficiency, it may be desirable to perform some of the steps of the methods in FIGS. 4 and 8 during a device's idle time (offline). More specifically, in instances where the user's device is not being used or is lightly used, it becomes beneficial to perform some of the operations described above to maximize the availability of a processor of the user's device and to reduce the response time when the actual recommendation is requested (online).

Many of the steps involved in the gathering and clustering of the data itself can be performed while offline.

In another embodiment of the present invention, the interest rating computation methods described above may be combined with other techniques to improve the recommendation process. For example, a solution based on user-selected preferences was previously described in this document. While such a solution is very limited when utilized alone, if such a preference-based solution were combined with the interest rating computation methods described above, it may act to improve upon either solution operated alone. For example, a user may be accessing a video player on his mobile device while at home in the evening. This current usage and context information may be processed according to one of the aforementioned techniques. Normally, based on the interest portion of the centroid closest to the current information, it may be determined that the user's interest in pop music and classical music is moderate and low, respectively. However, perhaps this person prefers classical music in the evenings at home, because that interest is shared by his family members. If the user indicated that fact by providing a preference for classical music, the computed interest of the user in classical music under those conditions may be upgraded to moderate or high. In another embodiment of the present invention, the preferences may even be granularized to the same level as the tracked contexts, such that the user could expressly indicate a fondness for classical music while at home in the evening.

In an alternative combination of the aforementioned interest rating computation methods and preference-based solution, the system may be designed to simply use the preference-based solution or a combination of the preference solution and the interest rating computation methods when preferences are indicated by a user, but to simply use the interest rating computation methods where no preferences are indicated. This allows preference-based information to still be utilized even when a large number of the users elect not to specify preferences, or where a user wishes to provide preferences for certain contexts but not others.

Sometimes the stored data may lack information pertaining to the interests of a user in a particular object of interest. Mobile devices, for instance, may be effective at tracking the user's interests in various software applications, but may be less effective at gathering information about non-computer-related interests, such as interests in sports or clothes. Alternatively, the stored data may contain much information about a particular interest, but only under a narrow range of contexts and/or usage patterns. The stored data, for example, may indicate that a user repeatedly showed a strong preference for pop music when he is at home in the evening and is playing both a game application and a music application, but does not provide any information about such an interest under other conditions.

Such loopholes can complicate the prediction of interest ratings. For example, assume that the stored data lacks much information about a user's interest in pop music under various contexts and usage patterns. When the data points making up the stored data are clustered, the data points in a particular cluster may lack any information about pop music. As a result, the centroid generated from that particular cluster may also lack any information regarding an interest in pop music. Such a situation can be seen, for example, in centroid 550b of FIG. 5B. The "x" in the interest rating portion 554 of centroid 550b indicates that the centroid interest rating for pop music is unknown. This can mean that the centroid 550b cannot be used to compute an interest rating for pop music, which can be problematic if an interest in pop music is sought for a user whose current situation matches best with that particular centroid.

FIG. 8 presents an embodiment of the present invention in which these unknown values are supplemented, thus providing one way of enabling such interest computations. Steps 800, 802, 804, 806 and 808 can be similar to steps 400, 402, 404, 406 and 408, respectively, of FIG. 4. At step 804, the existence of a first centroid with an unknown interest rating in a first object of interest is noted.

Afterward, at step 803, the relevance of the first centroid to each of Z centroids is determined. Z is any integer and can be automatically determined, predetermined and/or configured on the fly depending on the needs of a particular application. Various criteria may be used to determine if any given centroid should be part of the Z centroids. One approach is to first determine the distances between the first centroid and one or more other centroids. These distances are based on the context portion, the application portion and/or the interest portion of the centroids. The distances can be calculated using any technique known in the art, including cosine distance, Euclidean distance and/or correlation. Using this approach, the Z centroids are those that were closest to the first centroid.

Figure 9:
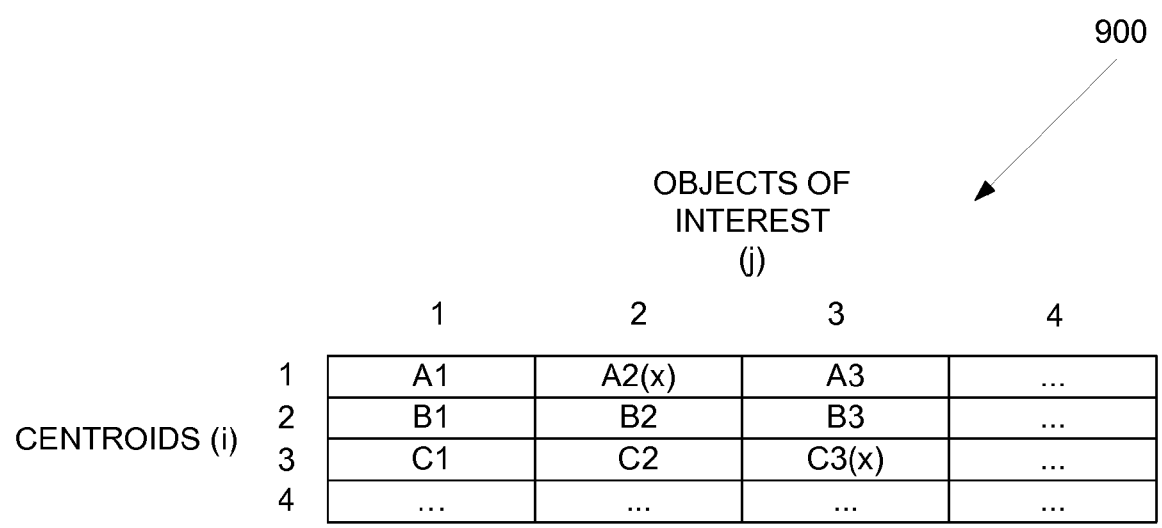
FIG. 9 is a diagram illustrating centroids according to an embodiment of the present invention.

FIG. 9 presents an exemplary arrangement 900 of Z=3 centroids and a centroid with an unknown interest rating. Arrangement 900 includes i centroids, where i ranges from 1 to 4. Each centroid i has interest information for j objects of interest, where j also ranges from 1 to 4. (In various embodiments, variables i and j are any integer.) Thus, A1 is an interest rating indicating an interest of a user in object of interest j=1, where A1 is derived from the cluster of data points associated with centroid i=1. Note that value A2 is marked with an "x," indicating that the cluster for centroid i=1 has limited or no data relating to an interest in object of interest j=2. It is therefore desirable to generate a supplementary interest rating for A2.

Applying step 803 of FIG. 8 to this task, relevancies between centroid i=1 (i.e., the centroid with unknown interest rating for interest object j=2) and the other 3 centroids are determined. At step 805, based on such relevancies, a supplementary interest rating is generated.

The determination of relevancies and the generation of a supplementary interest rating for A2 can be performed using various algorithms. One such algorithm is presented below:

$$p_{i,j} = \bar{r}_{i,\cdot} + \frac{\sum_{g=1}^{k} w_{i,g} \cdot (r_{g,j} - \bar{r}_{g,\cdot})}{\sum_{g=1}^{k} w_{i,g}}$$

In the above exemplary equation, $p_{i,j}$ is the predicted interest rating for the i-th centroid. This predicted interest rating indicates an interest in a j-th object of interest based on the data points in the cluster of the i-th centroid. $\bar{r}_{i,\cdot}$ and $\bar{r}_{g,\cdot}$ the average of one or more of the interest ratings for the i-th and g-th centroid, respectively. In arrangement 900, if the i-th centroid is the centroid i=1, then $\bar{r}_{i,\cdot}$ can refer to one, several or all of the interest ratings on the corresponding row for centroid i=1 (i.e., A1, A3, etc.) $r_{g,j}$ refers to the interest rating of the g-th centroid, where the interest rating indicates an interest of a user in a j-th object of interest.

$w_{i,g}$ refers to the relevance of the i-th centroid to the g-th centroid. One approach to measuring this relevance is to calculate a distance between the interest ratings for the i-th centroid and the g-th centroid. By way of example, the relevance of centroid i=1 to centroid i=2 of arrangement 900 involves calculating a distance between a vector representing centroid i=1 (e.g., [A1 A3]) and a vector representing centroid i=2 (e.g., [B1 B3].) Note that in this exemplary calculation, A2 and B2 were omitted, because centroid i=1 and centroid i=2 do not both have known interest ratings for object of interest j=2. People of ordinary skill in the art are aware that various methods may be used to calculate the distances, including an absolute and an Euclidean distance.

Steps 803 and/or 805 could be repeated to eliminate some or all of the unknown interest ratings among the centroids. Once one supplementary interest rating has been generated through step 805, it may be used in turn as an input to an algorithm that generates another supplementary interest rating for the same or a different centroid. For example, once a supplementary interest rating for A2 of FIG. 9 is computed, it can be used in conjunction with a repeat of step 805 to compute the unknown interest rating C3.

It should be noted that various techniques may be used to supplement unknown interest ratings, depending on the needs of a particular application. One approach is to simply take the midpoint of the range for the interest rating in question. For example, assume that a particular unknown interest rating indicates a user's interest in pop music, and is measured on a range between 0 and 6. The unknown interest rating could be supplemented with a value approximating 3, because 3 is an approximate midpoint in the range between 0 and 6. Another approach is to take the average of some or all of the interest ratings associated with the centroids and/or the stored data.

Additionally, steps 803 or 805 are not limited to supplementing entirely unknown interest ratings. In some cases, a centroid may have an interest rating for a particular object of interest, but for whatever reason, the interest rating is deemed to be poorly supported and/or unreliable. Various thresholds can be used to determine when a certain centroid interest rating is unreliable. For example, a centroid interest rating may be deemed unreliable when it is backed by too few data points in the corresponding cluster. Steps 803 and 805 can be used to supplement unreliable as well as unknown interest ratings.

After the desired number of supplementary interest ratings have been generated, the method of FIG. 8 continues with step 806. A data point representing current information is received. The current information may include context and/or application usage information. A cluster is selected by comparing this current information with at least the corresponding context and/or interest portions of the associated centroids. At step 808, based on the selected cluster(s), an interest rating is computed. The interest rating indicates an interest of a user in one or more objects of interest, given the current information. Step 806 can share any of the features described above in connection with step 404 of FIG. 4.

Figure 10:
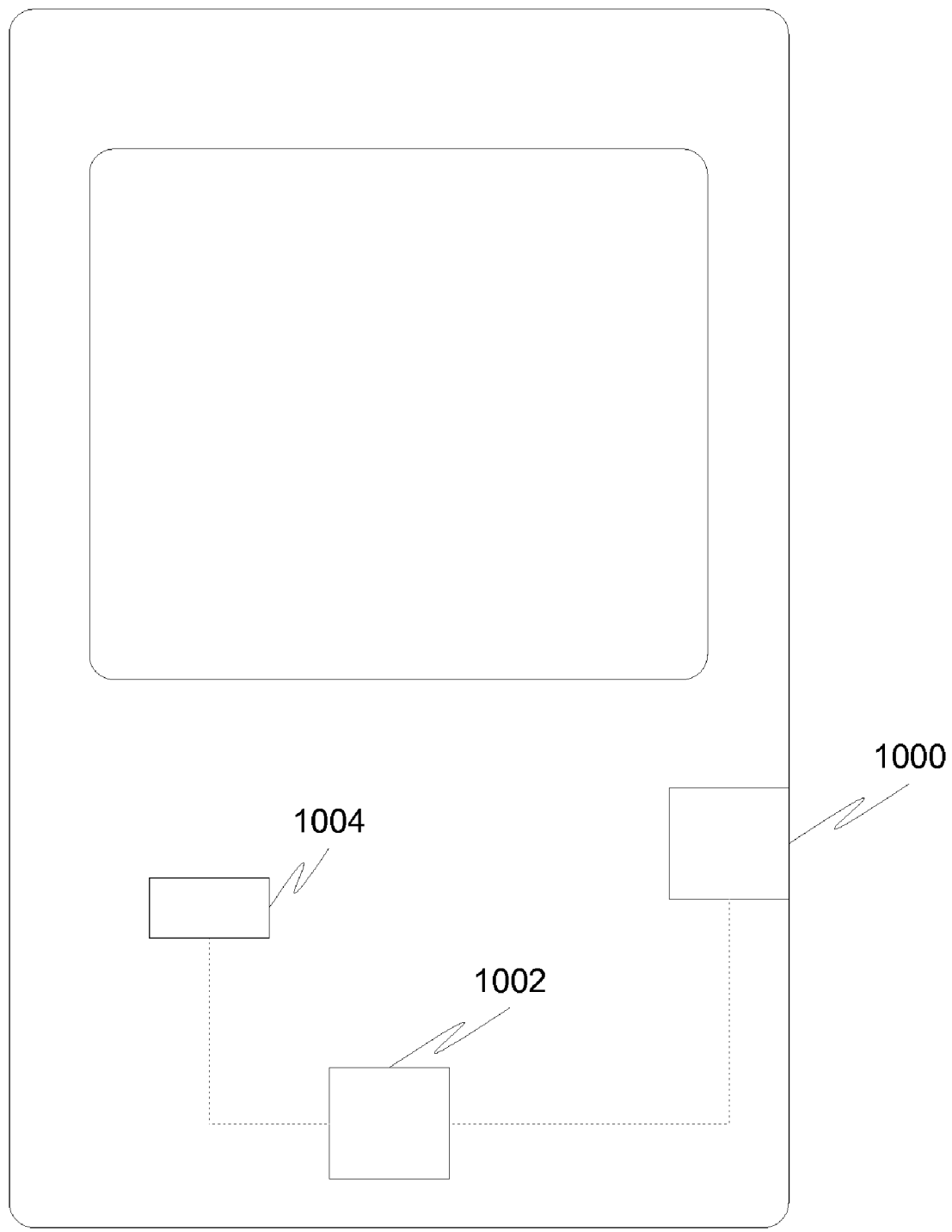
FIG. 10 is a block diagram illustrating a system in accordance with an embodiment of the present invention.

FIG. 10 is a block diagram illustrating a system in accordance with an embodiment of the present invention. In this diagram the system is a mobile device. One of ordinary skill in the art will recognize, however, that the system may be embodied in many different devices or in groups of devices. For example, the system may comprise a mobile device having a processor that performs some of the recited steps and also comprise a server that performs other of the recited steps. In another example, the system may comprise a desktop computer.

The system may include an interface 1000 and one or more processors 1002. The processors may be configured to perform some or all of the steps recited in FIGS. 4 and 8 and the corresponding text above. Additionally, when the system includes a mobile device, it may include a load detection module 1004. The load detection module may detect the load level of processor 1002 (i.e., how busy the processor is). In such a case, the one or more processors may then be configured to perform the storing, and clustering, and determining when the device is not being used or is lightly used and to perform the selecting, computing, and recommending when the actual recommendation is requested by a user.

The steps of FIGS. 4 and 8 can be integrated in various ways into a wide assortment of electronic devices. One approach involves a mobile device, such as a Personal Digital Assistant or a cell phone, which collects application usage information and context information about its owner. For example, a user may use the mobile device to access a search engine such as Google or Yahoo. The user may also enter search terms into the phone to check the prices of various items or to explore an on-line store, such as Amazon.com. When the user does so, the mobile device may store data tracking what was searched for and the context or applications involved in the search (e.g., the user was running a browser and conducted his search at 3:00 pm while in a shopping mall.) The searches can help indicate the interests of the user in various contexts and when using various applications. Algorithms run by the mobile device can translate these facts into interest ratings that indicate an interest of the user in particular objects of interest, such as pop music, game applications on the mobile device, etc. The processors on the mobile device may cluster the stored data, determine centroids and predict the interests of the user on the fly in accordance with any aspect of FIGS. 4-9. Under certain conditions, the mobile device could run a particular application or present an advertisement based on its computation of various interests.

It should be noted that the techniques of the invention can be combined with other techniques. For example, the techniques of the invention can be used in combination with the techniques for predicting interest described in U.S. patent application Ser. No. 12/343,395, entitled: "CONTEXT-BASED INTERESTS IN COMPUTING ENVIRONMENTS AND SYSTEMS," which is hereby incorporated by references herein for all purposes.

It should also be noted that the techniques of the invention can be used in combination with the techniques described in U.S. patent application Ser. No. 12/134,143, entitled: "SITUATION-DEPENDENT RECOMMENDATION BASED ON CLUSTERING," which is hereby incorporated by references herein for all purposes.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for predicting an interest of a user in an object of interest, the method comprising:
    storing data relating to usage patterns of the user, wherein the data includes a context portion having information as to the context in which items were used, and an interest rating portion indicative of an interest of the user in one or more objects of interest, wherein the context is the situation in which the user or device operated by the user is operating when the items were used;
    clustering the data into clusters of data points;
    determining, for each of the clusters, a centroid, wherein the centroid includes a context portion and an interest rating portion;
    receiving a current context of the user;
    selecting clusters by comparing a data point representing the current context with the context portion of one or more centroids, wherein clusters with centroids having context portions more similar to the current context are selected over clusters with centroids having context portions less similar to the current context;
    computing, based on interest ratings in the interest rating portion of the centroids of the selected clusters, an interest rating indicative of an interest of the user in one of the one or more objects of interest that has no interest rating in its corresponding interest rating portion, given the current context; and
    determining an item to recommend to the user based on the current context and also based on data points having interest rate portions with interest rates that were computed during the computing step as well as data points having interest portions with interest rates that were not computed during the computing step.

2. The method of claim 1, wherein:
    the stored data includes an application portion having information as to the items that were used;
    each of the centroids includes an application portion;
    the receiving operation includes receiving current application information of the user; and
    the selecting operation is performed by comparing a data point representing the current application information and the current context with the application portion and the context portion of one or more centroids.

3. The method of claim 2, wherein the application portion of the stored data indicates a plurality of software applications executed by a plurality of physical actions by the user on one or more electrical devices at a plurality of different points in time.

4. The method of claim 3, wherein the context portion of the stored data indicates at least one of a group consisting of: a) one of the plurality of different points in time at which one of the plurality of software applications was executed by one of the plurality of physical actions of the user; b) a physical location of the user when one of the plurality of software applications was executed by one of the plurality of physical actions of the user.

5. The method of claim 1, wherein:
    a first cluster of the clusters contains an associated first plurality of data points;
    each of the first plurality of data points includes an interest rating indicative of an interest of the user in a first object of interest;
    the interest rating portions of the first cluster includes a first cluster interest rating indicative of an interest of the user in the first object of interest, wherein the first cluster interest rating is based on an average of the interest ratings of the first plurality of data points.

6. The method of claim 1, wherein:
    the interest rating portion of each centroid includes a centroid interest rating;
    each centroid is associated with one of the clusters of data points, each data point having a data point interest rating; and
    the centroid interest rating of each centroid is based on an average of at least some of the data point interest ratings of the data points in the associated cluster.

7. A method for predicting an interest of a user in an object of interest, the method comprising:

storing data relating to usage patterns of the user, wherein the data includes a context portion having information as to the context in which items were used, and an interest rating portion indicative of an interest of the user in one or more objects of interest;

clustering the data into clusters of data points;

determining, for each of the clusters, a centroid, wherein the centroid includes a context portion and an interest rating portion;

receiving a current context of the user;

selecting clusters by comparing a data point representing the current context with the context portion of one or more centroids;

computing, based on the selected clusters, an interest rating indicative of an interest of the user in one of the one or more objects of, given the current context;

determining a relevance of the first centroid to each of the Z centroids; and based on the relevancies and the interest rating portions of the Z centroids, generating an interest rating indicative of an interest of the user in the first object of interest;

wherein a first centroid of the centroids has a first interest rating portion that has an unknown interest rating indicative of an unknown level of interest of the user in a first object of interest of the one or more objects of interest;

wherein each one of Z other centroids has interest rating portions with known interest ratings indicative of known levels of interest in the first object of interest, Z being any integer over 0.

8. The method of claim 7, wherein:

the relevancies are based on distances between the first centroid and each of the Z centroids.

9. The method of claim 8, wherein the distances are based on at least one of the following: a) the application portions of the first centroid and the Z centroids; b) the context portions of the first centroid and the Z centroids; and c) the application portions and the context portions of the first centroid and the Z centroids.

10. The method of claim 9, wherein the distances are calculated using one of a group consisting of a) a cosine distance formula and b) a Euclidean distance formula; and c) a correlation formula.

11. The method of claim 9, wherein:

the first interest rating portion of the first centroid includes a plurality of interest ratings other than the unknown interest rating indicating an interest of the user in a plurality of different objects of interest respectively; and the generated interest rating is based on each of the plurality of interest ratings.

12. A method for predicting an interest of a user in an object of interest, the method comprising:

storing data relating to usage patterns of the user, wherein the data includes an application portion having information as to items which were used, a context portion having information as to the context in which the items were used, and an interest rating portion indicative of an interest of the user in one or more objects of interest;

clustering the data into clusters of data points;

determining, for each of the clusters, a centroid, wherein the centroid includes an application portion, a context portion and an interest rating portion and wherein a first centroid of the centroids has a first interest rating portion that has a first unknown interest rating indicative of an unknown level of interest of the user in a first object of interest of the one or more objects of interest and wherein each of Z other centroids have interest rating portions with a known interest rating indicating a known interest of the user in the first object of interest, Z being any integer over 0;

determining a relevance of the first one of the centroids to each of the Z centroids;

based on the relevancies and the known interest ratings of the Z centroids, generating a first supplementary interest rating in the first object of interest;

receiving current application information and a current context;

selecting clusters by comparing the current application information and the current context with the application portions and the context portions of one or more centroids; and computing, based on the selected clusters, an interest rating indicative of an interest of the user in one of the one or more objects of interest, given the current application information and the current context.

13. The method of claim 12, wherein:

the relevancies are based on distances between the applications portion and context portion of the first centroid and the application portion and the context portion of each of the Z centroids.

14. The method of claim 13, wherein the distances involve one of a group consisting of a) cosine distance and b) Euclidean distance; and c) absolute distance.

15. The method of claim 12, wherein:

a first cluster of the clusters contains an associated first plurality of data points;

each of the first plurality of data points includes an interest rating indicative of an interest of the user in a first object of interest;

the interest rating portions of the first cluster includes a first cluster interest rating indicative of an interest of the user in the first object of interest, wherein the first cluster interest rating is based on an average of the interest ratings of the first plurality of data points.

16. The method of claim 12, wherein:

one of the clusters contains a plurality of data points and corresponds to a second centroid of the centroids;

each of the plurality of data points includes a second interest rating indicative of an interest of the user in a second object of interest;

the interest rating portion of the second centroid includes a second centroid interest rating indicative of an interest of the user in the second object of interest, wherein the second centroid interest rating is based on an average of the second interest ratings of the plurality of data points.

17. The method of claim 12, wherein:

the stored data includes data components relating to usage patterns of the user, wherein each data component includes a data situation of a plurality of situations, a data application usage pattern of a plurality of data application usage patterns, and a set of data interest ratings indicative of an interest of the user in at least some of a plurality of objects of interest and wherein each of the plurality of situations includes a plurality of context variables, each of the plurality of context variables having a plurality of possible context values;

the clustering operation includes associating a subset of the data components with each of the clusters; and the determining of a centroid for each of the clusters includes associating the centroid with the subset of data components associated with the cluster, wherein the centroid includes a centroid application usage pattern, a centroid situation and a set of centroid interest ratings, the centroid application usage pattern and the centroid situation generated by a centroid algorithm that uses, as inputs, the data application usage patterns and the data situations of the associated subset of data components and wherein the centroid interest rating is based on the data interest ratings of the associated subset of data components and wherein the set of centroid interest ratings for the first centroid includes the unknown interest rating.

18. The method of claim 17, wherein the relevancies are based on calculating distances between one of the following: a) the centroid application usage patterns of the first centroid and each of the Z centroids; b) the centroid situations of the first centroid and each of the Z centroids; and c) the centroid application usage patterns and the centroid situations of the first centroid and each of the Z centroids.

19. The method of claim 18, wherein the distances involve one of a group consisting of a) cosine distance; b) Euclidean distance; and c) a correlation.

20. The method of claim 17, wherein:
a second centroid of the centroids having a set of centroid interest ratings including a second unknown interest rating indicative of an unknown interest of the user in a second object of interest of the plurality of objects of interest, the second unknown centroid interest rating having a range of possible interest values;
the method further comprising:
generating a second supplementary interest rating to supplement the second unknown interest rating, the second supplementary interest rating based on at least one of the following: a) an approximate midpoint in the range of possible interest values; and b) averaging the data interest ratings of the data components.

21. The method of claim 17, wherein a first one of the plurality of context variables indicates a time of day and a second one of the plurality of context variables indicates a location of the user.

22. An apparatus comprising:
an interface; and
one or more processors configured to:
store data relating to usage patterns of the user, wherein the data includes an application portion having information as to items which were used, a context portion having information as to the context in which the items were used, and an interest rating portion indicating an interest of the user in one or more objects of interest, wherein the context is the situation in which the user or device operated by the user is operating when the items were used;
cluster the data into clusters of data points;
determine, for each of the clusters, a centroid, wherein the centroid includes an application portion, a context portion and an interest rating portion;
receive current application information and a current context;
select clusters by comparing a data point representing the current application information and the current context with the application portions and the context portions of one or more centroids, wherein clusters with centroids having context portions more similar to the current context are selected over clusters with centroids having context portions less similar to the current context; and
compute, based on interest ratings in the interest rating portion of the centroids of the selected clusters, an interest rating indicative of an interest of the user in one of the one or more objects of interest, that has no interest rating in its corresponding interest rating portion given the current application information and the current context; and
determine an item to recommend to the user based on the current context and also based on data points having interest rate portions with interest rates that were computed during the computing step as well as data points having interest portions with interest rates that were not computed during the computing step.

23. The apparatus of claim 22, wherein the apparatus is a mobile device.

24. A system for predicting an interest rating indicating an interest of a user in an object of interest, the system comprising:
means for storing data relating to usage patterns of the user, wherein the data includes a context portion having information as to the context in which items were used, and an interest rating portion indicative of an interest of the user in one or more objects of interest, wherein the context is the situation in which the user or device operated by the user is operating when the items were used;
means for clustering the data into clusters of data points;
means for determining, for each of the clusters, a centroid, wherein the centroid includes a context portion and an interest rating portion;
means for receiving a current context of the user;
means for selecting clusters by comparing a data point representing the current context with the context portion of one or more centroids, wherein clusters with centroids having context portions more similar to the current context are selected over clusters with centroids having context portions less similar to the current context;
means for computing, based on interest ratings in the interest rating portion of the centroids of the selected clusters, an interest rating indicative of an interest of the user in one of the one or more objects of interest that has no interest rating in its corresponding interest rating portion, given the current context; and
means for determining an item to recommend to the user based on the current context and also based on data points having interest rate portions with interest rates that were computed during the computing step as well as data points having interest portions with interest rates that were not computed during the computing step.

25. A computer readable medium embodied in a tangible form including executable computer program code operable to predict an interest in an object of interest in a situation, wherein the computer readable medium includes:
executable computer code operable to store data relating to usage patterns of the user, wherein the data includes an application portion having information as to items which were used, a context portion having information as to the context in which the items were used, and an interest rating portion indicative of an interest of the user in one or more objects of interest;
executable computer code operable to cluster the data into clusters of data points;
executable computer code operable to determine, for each of the clusters, a centroid, wherein the centroid includes an application portion, a context portion and an interest rating portion and wherein a first centroid of the centroids has a first interest rating portion that has a first unknown interest rating indicative of an unknown level of interest by the user in a first object of interest of the one or more objects of interest and wherein each of Z other centroids have interest rating portions with a known interest rating indicating a known interest of the user in the first object of interest, Z being any integer over 0;

executable computer code operable to determine a relevance of the first one of the centroids to each of the Z centroids;

executable computer code operable to generate, based on the relevancies and the known interest ratings of the Z centroids, a first supplementary interest rating in the first object of interest, thereby supplementing the unknown interest rating of the first one of the centroids with the first supplementary interest rating;

executable computer code operable to receive current application information and a current context;

executable computer code operable to select clusters by comparing the current application information and the current context with the application portions and the context portions of one or more centroids; and executable computer code operable to compute, based on the selected clusters, a interest rating indicative of an interest of the user in one of the one or more objects of interest, given the current application information and the current context.

* * * * *